No. 786,717.

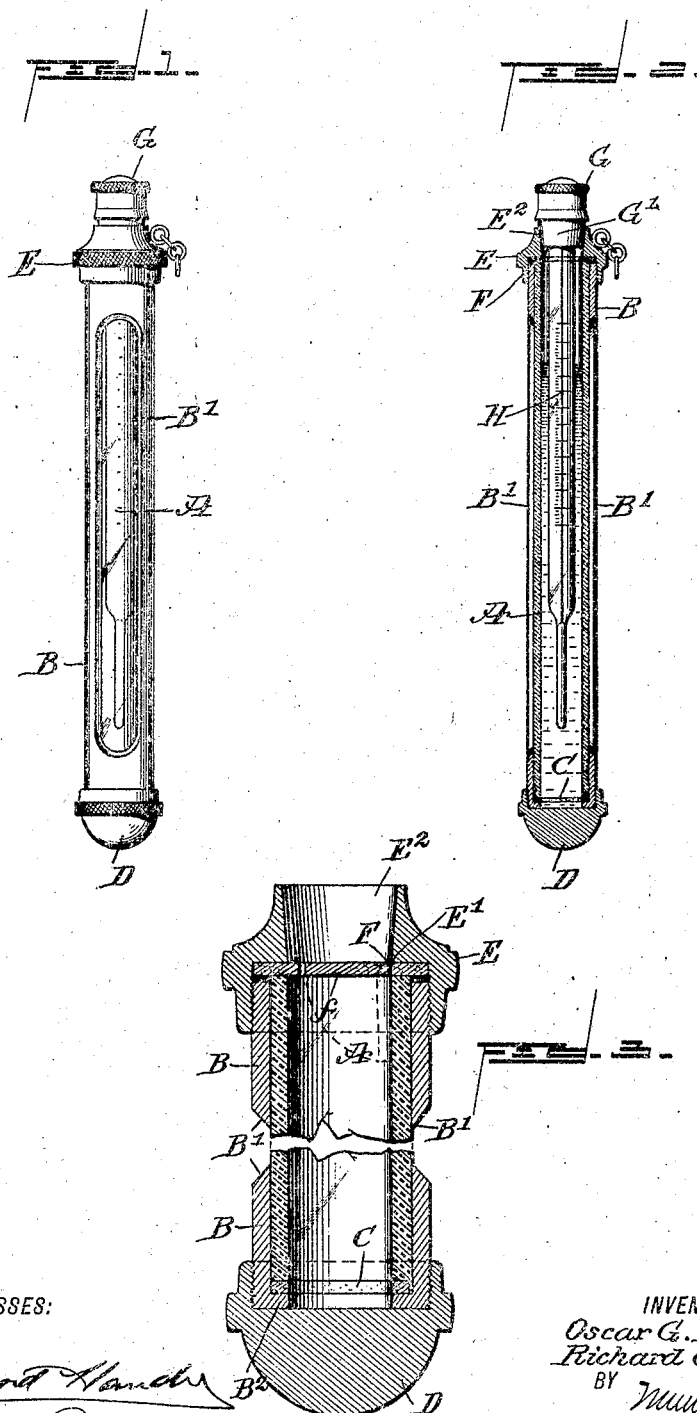

Patented April 4, 1905.

UNITED STATES PATENT OFFICE.

OSCAR G. BELL AND RICHARD C. STOFER, OF NORWICH, NEW YORK.

CLINICAL-THERMOMETER CASE.

SPECIFICATION forming part of Letters Patent No. 786,717, dated April 4, 1905.

Application filed July 9, 1904. Serial No. 215,902.

*To all whom it may concern:*

Be it known that we, OSCAR G. BELL and RICHARD C. STOFER, citizens of the United States, and residents of Norwich, in the county of Chenango and State of New York, have invented a new and Improved Clinical-Thermometer Case, of which the following is a full, clear, and exact description.

The object of the invention is to provide a new and improved clinical-thermometer case arranged to protect the glass tube containing the antiseptic solution against breakage and to permit convenient and quick withdrawal of the thermometer from the solution whenever it is desired to use the thermometer for its legitimate purpose.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a sectional side elevation of the same, and Fig. 3 is an enlarged sectional side elevation of the glass tube and metal casing.

The glass tube A for containing an antiseptic solution is open at both ends and is fitted within a tubular metal casing B, having cut-out portions B' between its ends to allow of viewing the glass tube and its contents. The lower end of the metal casing B is provided with an inwardly-extending annular flange $B^2$, on which rests a washer C, of leather or other suitable soft material, forming a seat for the lower end of the glass tube A to prevent breaking of the same on accidentally jarring the clinical thermometer while in use. The lower end of the metal casing B is further provided with an external screw-thread, on which screws a bottom cap D for closing the lower end of the metal casing, and consequently the lower end of the glass tube A, to retain the antiseptic solution in the said glass tube. The upper end of the casing B is also provided with an external screw-thread, on which screws a head E, formed with an internal shoulder E', against which abuts a washer or gasket F, engaging the upper end of the glass tube A, which upper end slightly projects beyond the upper end of the casing B, so that the glass tube A is firmly held between the soft washers C and F. The head E is further provided with a conical mouth $E^2$, on which is adapted to be seated the conical portion G' of a cap G, in which is rigidly secured the upper end of a thermometer H of usual construction. The conical mouth $E^2$ has smooth sides, which at the lower end are flush with the inner walls or bore of the glass tube.

The washer F is preferably of the construction shown and described in the United States Patents to O. G. Bell, No. 726,619, April 28, 1903, and to Windolph and Stofer, No. 702,387, June 10, 1902—that is to say, the said washer F is to be equipped with a flap-valve to close the upper end of the tube A to prevent spilling the antiseptic solution at the time the cap G is removed and the thermometer withdrawn and also to automatically wipe the adhering liquid from the thermometer when removing it from the case. Such a flap-valve is shown in Fig. 3 at $f$, and when the thermometer is inserted this flap-valve is forced inwardly and lies between the thermometer and the wall of the inclosing tube, as shown in dotted lines.

From the foregoing it will be seen that the metal casing B firmly protects the glass tube against breakage, and at the same time the glass tube is so mounted between the two soft flexible washers that it is not liable to break on accidentally jarring the clinical thermometer. It will further be seen that by having the cut-out portions B' arranged between the ends of the tubular casing B the latter is rendered comparatively light, and at the same time the contents of the glass tube can be viewed from the outside to enable the user to see that the solution is not contaminated and the thermometer H is in good condition.

By having the conical mouth $E^2$ on the head E the cap G can be firmly seated in the said mouth and conveniently removed therefrom whenever it is desired to use the thermometer H for its legitimate purpose, and at the same time the conical portion G' of the cap hermetically closes the head E to prevent leakage of the solution in case the thermometer is laid flat down on a table or other support.

Having thus described our invention, we claim as new and desire to secure by Letters Patent—

1. A clinical-thermometer case comprising a glass tube, a tubular metal casing inclosing the glass tube and having an exterior screw-thread at its upper end, a head having an interior screw-thread, screwed upon the upper end of the casing and formed with a smooth conical mouth having its sides at the lower end flush with the bore of the glass tube, a soft washer arranged in the head between the same and the upper ends of the tube, and a cap fixed to and carrying the thermometer, said cap being formed with a conical surface fitting the conical surface of the mouth substantially as described.

2. A clinical-thermometer case comprising a glass tube open at both ends, a tubular metal casing inclosing the glass tube, said metal casing being formed at both ends with external screw-threads and having an inwardly-turned flange at the bottom, a soft washer arranged between said flange and the glass tube, a cap with interior screw-threads screwed upon the lower end of the casing, a head with interior screw-threads, screwed upon the upper end of the casing, said head being formed with a conical mouth tapering to the bore of the glass tube, a soft washer arranged in the head between the same and the tube, and a conical cap connected to and carrying the thermometer and fitting the conical mouth substantially as shown and described.

In testimony whereof we have signed our names to this specification in the presence of two subscribing witnesses.

OSCAR G. BELL.
RICHARD C. STOFER.

Witnesses:
JOHN H. BYRNE,
GEO. H. ROWE.